(12) United States Patent
Eberling

(10) Patent No.: US 8,079,649 B2
(45) Date of Patent: Dec. 20, 2011

(54) VEHICLE CONDITION DEPENDENT SUPPLEMENTAL PARKING BRAKE SYSTEM WITH PROTECTION AGAINST AN UNWANTED APPLICATION

(75) Inventor: Charles E. Eberling, Wellington, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 463 days.

(21) Appl. No.: 12/355,202

(22) Filed: Jan. 16, 2009

(65) Prior Publication Data
US 2010/0181823 A1 Jul. 22, 2010

(51) Int. Cl.
*B60T 13/38* (2006.01)
(52) U.S. Cl. .................. 303/9.76; 303/9; 303/192
(58) Field of Classification Search .............. 303/6.01, 303/7, 8, 9.61, 9.76, 123, 191, 192, 198, 303/9
See application file for complete search history.

(56) References Cited

U.S. PATENT DOCUMENTS

| | | | |
|---|---|---|---|
| 3,861,754 A | 1/1975 | Kruke et al. | |
| 4,018,485 A | 4/1977 | Fannin | |
| 4,121,873 A | 10/1978 | Durling | |
| 4,660,696 A | 4/1987 | Kusaka | |
| 6,758,298 B2 | 7/2004 | Eberling et al. | |
| 7,000,998 B2 | 2/2006 | Hano et al. | |
| 2007/0052291 A1* | 3/2007 | Eberling et al. | 303/191 |
| 2008/0153669 A1 | 6/2008 | Peterson | |

FOREIGN PATENT DOCUMENTS
GB 2 272 031 5/1994

OTHER PUBLICATIONS

Bendix Service Data # SD-03-4650; Bendix TR-2, TR-3 & TR-4 Inversion Valves; pp. 1-4.
Bendix Service Data # SD-03-2202; Bendix Double Check Valves; pp. 1-4.
Bendix Service Data # SD-03-4020; Bendix SV-1 Synchro Valve SV-3 & SV-4 Trailer Release Valve; pp. 1-6.
Bendix Service Data # SD-03-817; Bendix E-6 & E-10 Dual Brake Valves; pp. 1-8.
Bendix Service Data # SD-03-830; Bendix E-8P & E-10P Dual Brake Valves; pp. 1-8.
Bendix Service Data # SD-03-2010; Bendix PR-2, PR-3 & PR-4 Pressure Protection Valves; pp. 1-4.
Bendix Service Data # SD-02-4600 Bendix DD-3 & SD-3 Safety Actuators; pp. 1-6.
Bendix Service Data # SD-03-1064; Bendix R-12 & R-14 Relay Valves; pp. 1-6.
Bendix Service Data # SD-03-3619; Bendix PP-DC Park Control Valve; pp. 1-6.
Bendix Service Data # SD-02-4500; Bendix Piggyback Spring Brake; pp. 1-6.

* cited by examiner

*Primary Examiner* — Thomas J Williams
(74) *Attorney, Agent, or Firm* — Fay Sharpe LLP

(57) ABSTRACT

A vehicle brake system for a vehicle comprises at least one source of pressurized air for pressurizing the vehicle brake system, and a brake actuator configured to receive air from the source of pressurized air. A control is operatively associated with the source of pressurized air for selective application of the brake actuator. A supplemental parking brake control system is in communication with the control and the brake actuator. The control system is responsive to data indicative of gradient and speed vehicle conditions. The control system is configured to send a signal to the brake actuator to allow gradient and speed dependent supplemental parking. The control system is configured to prevent application of the brake actuator.

17 Claims, 2 Drawing Sheets

VEHICLE CONDITION DEPENDENT SUPPLEMENTAL PARKING BRAKE SYSTEM WITH PROTECTION AGAINST AN UNWANTED APPLICATION

BACKGROUND

The present disclosure generally relates to vehicle braking systems, and more particularly, to a supplemental parking brake system, the actuation of the brake system being dependent on predetermined vehicle conditions.

Heavy duty vehicles, such as military vehicles, must sometimes park on gradients of up to 60%. Parking on such gradients is almost impossible without parking brakes being applied on the front axle. An unwanted application of the front (e.g., spring applied) parking brakes can cause an undesirable effect on the vehicle dynamically.

To protect against unwanted front brake application and the concern normally associated with a spring applied parking brake on the front axle, the present disclosure provides a vehicle condition dependent supplemental parking system.

BRIEF DESCRIPTION

According to one aspect of the present disclosure, a vehicle brake system for a vehicle comprises at least one source of pressurized air for pressurizing the vehicle brake system, and a brake actuator configured to receive air from the source of pressurized air. A control is operatively associated with the source of pressurized air for selective application of the brake actuator. A supplemental parking brake control system is in communication with the control and the brake actuator. The control system is responsive to data indicative of gradient and speed vehicle conditions. The control system is configured to send a signal to the brake actuator to allow gradient and speed dependent supplemental parking. The control system is configured to prevent application of the brake actuator.

According to another aspect of the present disclosure, a supplemental brake control system for a front pneumatic brake circuit of a vehicle is provided. The front pneumatic brake circuit includes a source of pressurized air for pressurizing the brake circuit. A front pneumatic brake actuator is configured to receive air from the source of pressurized air. A control is in communication with the source of pressurized air and is configured to send a pneumatic signal to the front pneumatic brake actuator to exhaust pressurized air to atmosphere to actuate the front pneumatic brake actuator. The brake control system comprises a valve and a plurality of switches. The valve is in communication with the control and the front pneumatic brake actuator. The valve has a normally open state for preventing actuation of the front pneumatic brake actuator and a closed state to actuate the front pneumatic brake actuator. The plurality of switches is in communication with the control and the valve. Individual switches are responsive to data indicative of a vehicle condition. Each switch is actuated once its respective vehicle condition is met. The valve is in the open state and the front pneumatic brake actuator remains released when all switches are not actuated and all vehicle conditions are not met. Actuation of each switch sends a signal to the valve to move to the closed state and actuate the front pneumatic brake actuator.

According to yet another aspect of the present disclosure, a method of providing supplemental front parking for a vehicle is provided. Air pressure is provided to a front parking brake actuator. The front parking brake actuator is activated as a function of vehicle gradient and vehicle speed conditions.

DETAILED DESCRIPTION

It should, of course, be understood that the description and drawings herein are merely illustrative and that various modifications and changes can be made to the pneumatic brake system or park system disclosed without departing from the scope of the present disclosure. It will also be appreciated that the various identified components of the pneumatic brake system disclosed herein are merely terms of art that may vary from one manufacturer to another and should not be deemed to limit the present disclosure. Further, details of the identified components of the pneumatic brake system disclosed herein are well known and are commercially available from the assignee of the subject invention so that only selected details will be described herein for purposes of brevity.

Figure 1:
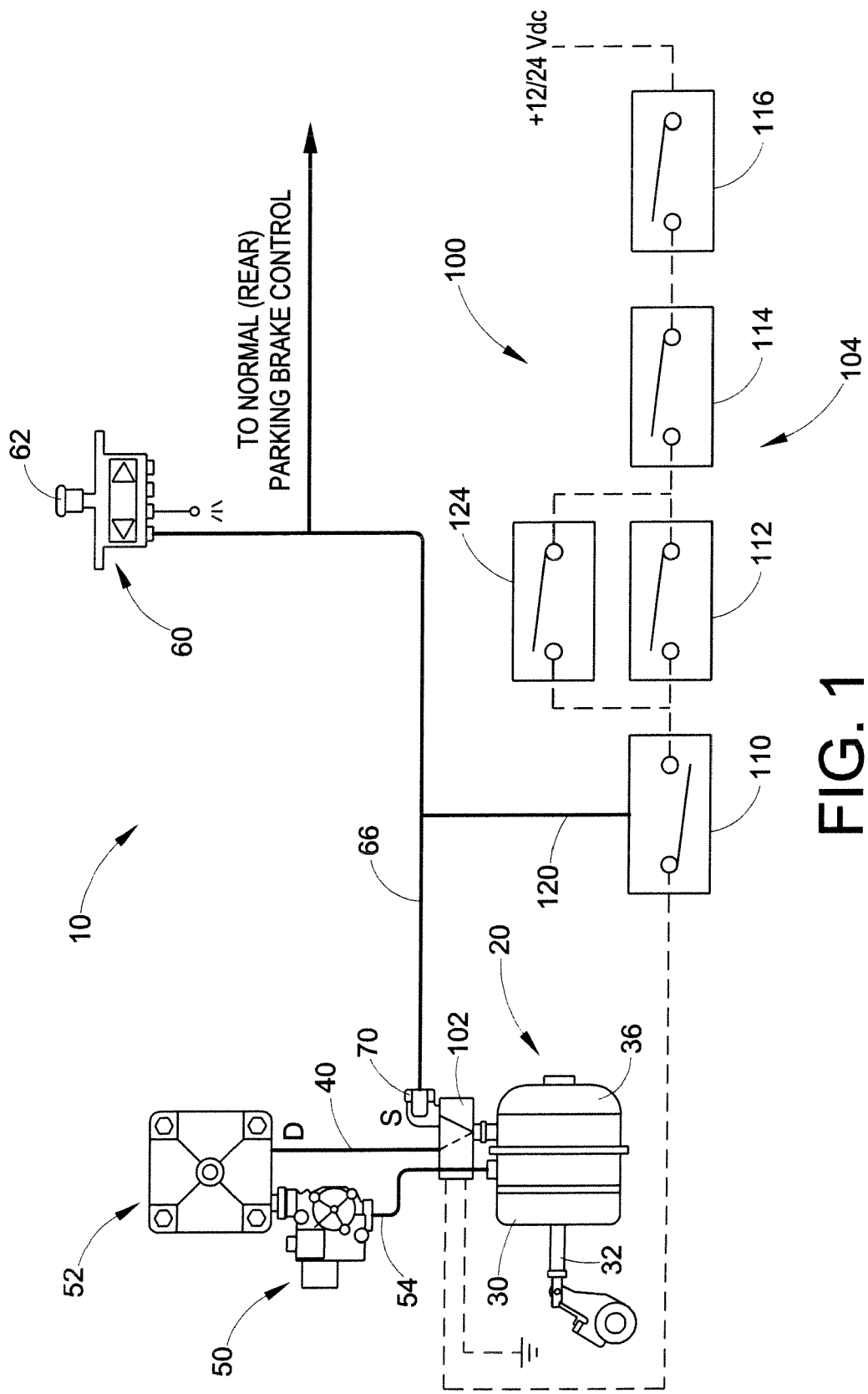
FIG. 1 is a partial schematic diagram illustrating a pneumatic brake system for a vehicle according to one aspect of the present disclosure.

Referring now to the drawings, wherein like numerals refer to like parts throughout the several views, FIG. 1 partially schematically illustrates a pneumatic vehicle brake system according to one aspect of the present disclosure, which is generally indicated by reference numeral 10. The brake system generally is for use in a heavy duty vehicle (not shown), such as a military vehicle; although, this is not required. The brake system 10 has at least one source of pressurized air (not shown), for example, in the form of a fluid pressure reservoir, for pressurizing the brake system. The reservoir can be charged with fluid pressure by a conventional air compressor (not shown) operated by the engine of the vehicle on which the brake system 10 is implemented.

A brake actuator 20 for, for example, a front axle of a vehicle is configured to receive air from the source of pressurized air. In the depicted embodiment, the brake actuator 20 is spring actuator which converts the energy of air pressure into mechanical force. The brake actuator 20 generally includes a service chamber 30, a push rod 32 and a tandemly mounted spring brake chamber 36 to and from which fluid pressure is admitted and exhausted by way of a conduit 40 to control the spring brake. The reduction or absence of air pressure in the spring brake chamber 36 actuates the brake actuator.

An antilock brake system (ABS) modulator 50 and a service relay valve 52 are operatively associated with the service chamber 30 of the brake actuator 20 via conduit 54. The ABS modulator is configured to modulate the brake actuator 20 associated with the front axle in a manner known in the art. Upon signal pressure from the ABS modulator, the service relay valve is configured to graduate, hold or release air pressure from the service chamber 30 to which it is connected. The service relay valve 52 provides anti-compounding so that if an operator makes a service brake application, that same pressure goes into the spring brake chamber 36 so that there is no overstress of the mechanical components of the brake actuator 20. In other words, the service relay valve 52 prevents simultaneous application of the service brake and the spring brake.

A control 60 is operatively associated with the source of pressurized air for selectively activating the brake actuator 20. As depicted, the control 60 is a push-pull manually operable on-off air control valve with an exhaust function, which is typically mounted on the dash of a heavy duty vehicle. The control typically includes at least two ports, a source or supply port where air enters the control and an outlet or delivery port which supplies air pressure therefrom. The control 60 is pressure sensitive in that it can automatically move from the applied to the exhaust position if total brake system pressure drops below a predetermined trip brake system pressure. Also, manually pulling a button 62 of the control 60 will send a pneumatic signal to the brake actuator 20 for application of the brake actuator. The control receives pressurized air from the source and when the button 60 is pushed in, the control delivers air to the spring brake chamber 36 by way of delivery conduit 66. A single check valve 70 fluidly connects the conduit 66 to the spring brake chamber and allows air flow only in one direction into the spring brake chamber. The air releases the spring brake actuator for normal vehicle operation. As indicated previously, to apply the brake actuator, the button 60 is pulled out. This exhausts the control delivery and releases air from the spring brake chamber 36 by way of conduit 40. The structure and operation of the disclosed valves and brake actuator of the brake circuit 10 described to this point is generally conventional so that further discussion herein is deemed unnecessary to a full and complete understanding of the present disclosure.

The supplemental brake control system 100 for the pneumatic brake circuit 10 controls the actuation of the brake actuator 20. The control system is in communication with the control 60 and the brake actuator and is responsive to data indicative of at least gradient and speed vehicle conditions. The control system 100 is configured to send a signal to the brake actuator 20 to allow gradient and speed dependent supplemental front axle parking. The control system is also configured to prevent application of the brake actuator. As shown, the supplemental brake control system 100 comprises a valve 102 and a plurality of inputs 104, individual inputs indicative of a predetermined vehicle condition.

The valve 102 is operatively associated with the control system and is in communication with the control 60 and the brake actuator 20. In the depicted embodiment, the valve is an electro-pneumatic solenoid which is operatively associated with the spring brake chamber 36 and the single check valve 70. The solenoid valve 102 has a normally open state to prevent application of the brake actuator 20 and a closed state to activate the brake actuator. Particularly, the solenoid valve has to be flipped to the closed state to exhaust the air and apply the brake actuator 20.

The plurality of inputs 104 is in communication with the control 60 and the valve 102. In the exemplary embodiment, the plurality of inputs comprises a plurality of switches including a parking indicator switch 110, an incline indicator switch 112, a speed enable switch 114 and a vehicle ignition switch 116. The individual switches 110, 112, 114, 116 are responsive to data indicative of a vehicle condition, which at least partially include (i) a parking condition of the vehicle, (ii) a gradient of a road on which the vehicle is to be held stationary, (iii) a speed of the vehicle and (iv) a state of a vehicle ignition. Each switch is actuated once its respective vehicle condition is met. The valve 102 is in the open state and the brake actuator 20 remains released when all switches are not actuated and all vehicle conditions are not met. Actuation of each switch sends a signal to the valve 102 to move to the closed state and activate the brake actuator. Thus, the valve 102 is responsive to the signal from the plurality of inputs 104 to prevent activation of the brake actuator by the control 60 if all vehicle conditions are not met.

The parking indicator switch 110 is in communication with the control 60 and is responsive to data indicative of the control being actuated for a front vehicle park condition. In this embodiment, the parking indicator switch is a normally closed switch that can be selectively actuated when a pressure of the brake system 10 is reduced to a predetermined trip brake system pressure. In the depicted embodiment, a conduit 120 connects the parking indicator switch 110 to conduit 66. This allows for monitoring of air pressure by the parking indicator switch 110. Any reduction in air pressure, for example by the pulling of the button 62 of the control 60, will actuate the parking indicator switch 110. Alternatively, it should be appreciated that the parking indicator switch 110 can be configured to monitor the state of the control 60 such that the parking indicator switch is actuated by the pulling of the button 62.

The incline indicator switch 112 is responsive to data indicative of a gradient of a surface on which the vehicle is to be held stationary and is only actuated when a grade or hill is detected beneath the vehicle and the gradient is greater than a threshold gradient. In this embodiment, the incline indicator switch is a normally open switch that is selectively actuated on gradients greater than about twenty percent (20%); although, other gradients are contemplated. In one embodiment, to determine gradient, a grade sensor can be provided on the vehicle, the sensor being monitored by an electronic control unit (ECU) to determine if the vehicle is on a level surface. If a gradient greater than the threshold gradient is detected, the incline indicator switch will be actuated. The control system 100 further includes an override switch 124 that is configured to override the incline indicator switch 112 for verification of parking brake operation, particularly that the brake actuator 20 is functioning/operational on the axle of the vehicle. The override switch can be a push and hold type switch and is mainly used to service/test the vehicle brake actuator so that the vehicle does not have to be on an incline (i.e., a gradient greater than the threshold gradient) to actuate the incline indicator switch 112.

The speed enable switch 114 is responsive to data indicative of vehicle speed and is selectively actuated at vehicle speeds less than a threshold vehicle speed. In this embodiment, the speed enable switch 114 is a normally closed switch that is selectively actuated at vehicle speeds less than about three (3) mph; although, other vehicle speeds are contemplated. Existing ABS modulator wheel speed sensors or other suitable means can be utilized to detect vehicle speed. Finally, the vehicle ignition switch 116 is responsive to data indicative of a state of the vehicle ignition. Particularly, the vehicle ignition switch 116 is actuated when the vehicle ignition is on.

As indicated above, there are many ways to provide vehicle information to the plurality of switches 110, 112, 114, 116. For example, vehicle information provided from the ABS modulator, transmission, the dash (i.e., anywhere that information can be accessed from a conventional communication bus) can be transmitted to the switches for actuating each switch if its respective vehicle condition is met. For example, an ECU can be connected to a sensor group and arranged to receive input of the above mentioned vehicle conditions. In this example, the sensor group includes a gradient sensor, speed sensor and an ignition sensor. Signals from the sensors are transmitted to the ECU which differentiates the signals and emits energizing currents for controlling operation of the switches. It should also be appreciated alternative manners for providing gradient and speed dependent supplemental parking instead of the switches are contemplated. For example, the above described sensors for monitoring the vehicle conditions can transport signals to the ECU. The ECU can then emit an energizing current directly to the solenoid valve 102 to actuate the valve and move the valve to the closed state to actuate the brake actuator 20.

In operation, rear parking brake is normal under the full manual operational control of the operator. The control 60 is supplied with air pressure from the source of pressurized air to pressurize the spring brake chamber 36. The brake actuator 20 is sustained by the single check valve 70 and the solenoid valve 102. The parking brake control system 100 is in communication with the control 60 and the brake actuator 20. The control system is responsive to data indicative the vehicle conditions. The brake actuator is held off unless those vehicle conditions are met. As indicated above, the vehicle conditions are ignition switch being on, vehicle speed being below a predetermined threshold speed (for example about 3 mph), gradient of the vehicle exceeding a threshold gradient, and a park condition (i.e., the pulling of the control 60).

To actuate the brake actuator 20, the control button 62 can be pulled. As indicated previously, the control is pressure sensitive so that it can automatically move from an applied position to an exhaust position. In the applied position, the spring brake chamber 36 is pressurized and the spring brake is not activated. As brake supply pressure is reduced to the predetermined low trip pressure, the control 60 moves to the exhaust position, whereby the brake actuator is applied. The parking indicator switch 110 senses that the button of the control was pulled and/or is responsive to the reduction of brake system pressure (i.e., the pneumatic signal to the brake actuator via the control). If the incline indicator switch 112 is closed (the gradient was greater that what can be actually sustained with rear brake parking of the rear axle), the vehicle is below a certain speed (to close the speed enable switch 114) and the vehicle ignition switch is closed (the vehicle ignition is on), the control system 100 is configured to send a signal to the brake actuator to allow gradient and speed dependent supplemental front axle parking. Particularly, the control system 100 sends an energizing signal to the solenoid valve 102. In response to the signal, the solenoid valve will flip to the closed state to exhaust the spring brake chamber 36 through relay valve 52. To prevent application of the brake actuator 20, each of the vehicle conditions must be met in order for the brake actuator to be actuated or applied. If any one vehicle condition is not met, even though there may be a failure in the park circuit, the brake actuator will not be applied to the front axle. It should be appreciated that the brake system 10 can have alarms/diagnostics which will notify the operator that each of the switches has changed state. The speed and the gradient threshold values can be preset by the manufacturer of the vehicle to which the system 100 is implemented.

Figure 2:
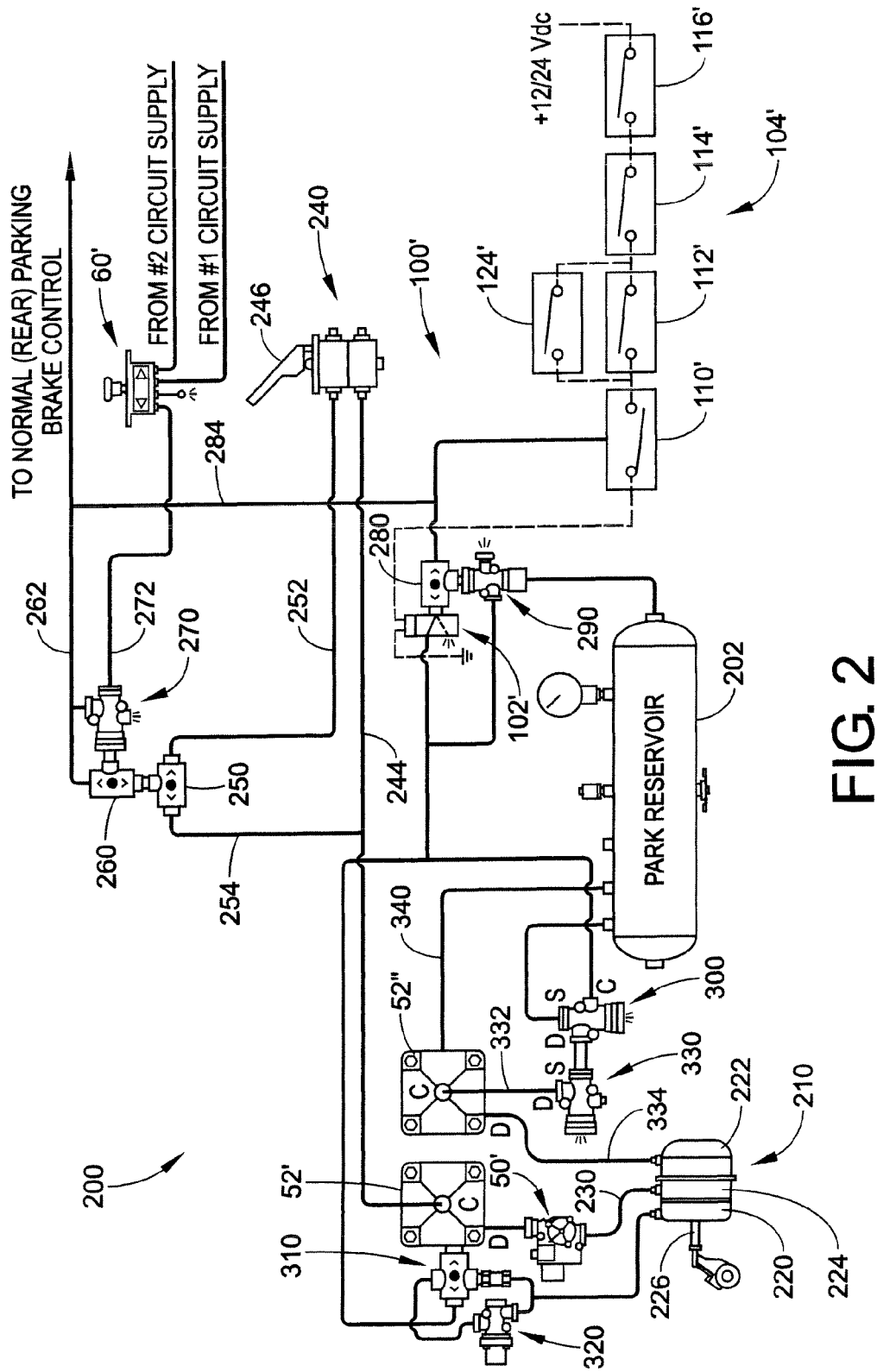
FIG. 2 is a partial schematic diagram illustrating a pneumatic brake system for a vehicle according to another aspect of the present disclosure.

With reference to FIG. 2, a partial schematic diagram of a pneumatic vehicle brake system, which is generally indicated by reference numeral 200, according to another aspect of the present disclosure is illustrated. Reference numerals with a primed suffix (') refer to like components (e.g., control 60 is referred to by reference numeral 60'), and new numerals identify new components of the brake system 200.

The pneumatic brake system 200 has at least one source of pressurized air, for example, in the form of a fluid pressure reservoir 202 for pressurizing the brake system. A brake actuator 210 is configured to receive air from the source of pressurized air. In the depicted embodiment, the brake actuator 210 is a dual diaphragm/lock type actuator having a lock port 220, an auxiliary/emergency port 222, a service port 224 and a mechanical push shaft 226. The actuator provides braking for service, emergency and parking. The actuator is adapted to effect a brake application when fluid pressure is communicated to either the service port 224 or the auxiliary port 222. If fluid pressure is also communicated to the lock port 220, the brake actuator is released in the normal manner when the fluid pressure level at the service port 224 or at the auxiliary port 222 is exhausted. However, if the pressure at the lock port 220 is vented (i.e., when the brake application is effected), the brake application will be "locked-on", thereby providing a parking brake capability. An antilock brake system (ABS) modulator 50' and a first service relay valve 52' (which may be of any conventional design known to those skilled in the art) are operatively associated with the service port 224 of the brake actuator 210 by way of conduit 230.

The first relay valve is fluidly connected to a foot control valve 240 via conduit 244. The foot control valve 240 is provided with two separate supply and delivery circuits for service (primary) and secondary braking, and includes a foot pedal/treadle 246 adapted to be selectively actuated by a vehicle operator. A primary or first supply is delivered by the foot control valve to a first supply port of a first double check valve 250 by way of conduit 252. A secondary supply is delivered by the foot control valve to both the first relay valve via conduit 244 and to a second supply port of the first double check valve 250 by way of conduit 254, which is connected to conduit 244. As is well known, the double check valve is configured to select the higher of the fluid pressure levels at the supply ports and direct the flow of pressurized air into its delivery port. When a brake application is effected by the operation of the foot pedal 246 on the foot control valve 240 by the vehicle operator, pressurized air is selectively delivered from the secondary supply to a control port C of the first relay valve 52'. As indicated previously with respect to the first embodiment, the first relay valve is provided with a supply port and a delivery port. The delivery port D is in communication with the ABS modulator. The first relay valve is responsive to the operation of the foot control valve 240 to communicate fluid pressure to the service port 224 of the brake actuator 210 for application of the service brake.

As shown in FIG. 2, a delivery port of a first double check valve 250 is connected to a first supply port of a second double check valve 260. A second supply port of the second double check valve 260 is operatively associated with the rear parking brake control by way of conduit 262. The delivery port of the second double check valve is connected to a control port of a sequence valve 270. The sequence valve 270 includes at least three ports, the control port, a supply port and a delivery port. As is well know, a source of pressure acting on the control port prevents the sequence valve 260 from receiving pressurized air into its supply port. A delivery port of the control 60' is fluidly connected to the supply port of the sequence valve 260 by way of conduit 272. The delivery port of the sequence valve delivers pressurized air to a first supply port of a third double check valve 280 by way of conduit 284, which is connected to conduit 262. A delivery port of the third double check valve 280 is in communication with a control port of a second sequence valve 290. The supply port of the second sequence valve 290 is connected to the fluid pressure reservoir 202. A delivery port of the second sequence valve is operatively associated with the brake actuator 210 and a second supply port of the third double check valve 280.

The pneumatic brake system 200 is provided with fail safe features which automatically divert to park brake application should a loss of brake system air pressure occur. Specifically, a first inversion valve 300 monitors brake system pressure being delivered to the brake actuator 210. The first inversion valve 300 is a normally open pilot-operated, inverting, on-off, two way valve. The first inversion valve includes a control port, a supply port and a delivery port which are labeled C, S and D, respectively. The control port C is in fluid communication with a first supply port of a fourth double check valve 310. A second supply port of the fourth double check valve is connected to the first relay valve 52'. A delivery port of the fourth double check valve 310 is fluidly connected to a supply port of a pressure protection valve 320, which is a normally closed, pressure control valve. A delivery port of the pressure protection valve 320 is operatively associated with the lock port 220 of the brake actuator 210. The supply port S of the first inversion valve 300 is fluidly connected to the fluid pressure reservoir 202. The delivery port D of the first inversion valve is connected to a supply port of a second inversion valve 330. A delivery port of the second inversion valve is connected to a control port C of a second relay valve 52" by way of conduit 332. The second relay valve 52" is in fluid communication with the auxiliary port 222 of the brake actuator via conduit 334 for actuation of the brake actuator. A supply port of the second relay valve 52" is fluidly connected to the fluid pressure reservoir 202 via conduit 340.

In a normal operating position, air pressure is applied to a lock port 220 of the brake actuator 210. This allows the push shaft 226 to freely move back and forth with the application and release of service air pressure. The brake actuator is actuated by releasing the air pressure from the lock port 220 and applying air pressure to the auxiliary port 222. The shaft 226 will push out and will not retract unless pressure is applied to the lock port. With the sustaining pressure applied to the actuator 210, an application of the brake actuator can be avoided. The piggybacking of the first and second inversion valves 300 and 330, respectively, pulses the brake actuator 210. In other words, when you park with the dual diaphragm/lock type actuator 210, pressure is removed from the lock port 220 and, at the same time, the auxiliary port 222 will be ramped to a predetermined pressure. The illustrated valve network provides the ramping (for example, up to about 80 psi and released) so that the brake actuator 210 is parked with locked force as opposed to pneumatic pressure. Thus, it is necessary to pulse a diaphragm of the brake actuator 210 to cause application of the brake actuator. Again, the structure and operation of the disclosed valves and brake actuator of brake circuit 200 described to this point is generally conventional so that further description herein is deemed unnecessary.

Similar to the previous embodiment, a supplemental brake control system 100' for the front pneumatic brake circuit 200 controls the actuation of the brake actuator 210. The control system is in communication with the control 60' and the brake actuator and is responsive to data indicative of gradient and speed vehicle conditions. The control system is configured to send a signal to the brake actuator to allow gradient and speed dependent supplemental front axle parking and prevent application of the brake actuator. As shown, the supplemental brake control system 100' comprises a valve 102' and a plurality of inputs 104'. The valve 102' is an electro-pneumatic solenoid having a normally open state for preventing activation of the brake actuator 210 and a closed state for activating the brake actuator.

The plurality of inputs is in communication with the control and the valve. Similar to the previous embodiment, the plurality of inputs comprises a plurality of switches including a parking indicator switch 110', an incline indicator switch 112', a speed enable switch 114' and a vehicle ignition switch 116'. The individual switches 110', 112', 114', 116' are responsive to data indicative of a vehicle condition, which include (i) a parking condition of the vehicle, (ii) a gradient of a road on which the vehicle is to be held stationary, (iii) a speed of the vehicle and (iv) a state of a vehicle ignition. Each switch is actuated once its respective vehicle condition is met. The valve 102' is in the open state and the brake actuator 210 remains released when all switches are not actuated and all vehicle conditions are not met. Actuation of each switch sends a signal to the valve to move to the closed state and activate the brake actuator 210. Thus, the solenoid valve is responsive to the signal from the plurality of switches 104' to prevent activation of the brake actuator 210 by the control 60' if all vehicle conditions are not met.

As is evident from the foregoing, a method of providing supplemental front parking for a vehicle is provided. Air pressure is provided to a brake actuator. The brake actuator is activated as a function of vehicle gradient and vehicle speed conditions. Accordingly to one exemplary embodiment, the brake actuator is activated if the gradient is greater than about 20% and the vehicle speed is less than about 3 mph. In addition to gradient and speed vehicle conditions, to activate the brake actuator, the vehicle ignition has to be on and a vehicle park condition has to be met. A valve is in communication with the brake actuator and is selectively actuated to activate the brake actuator if all the above vehicle conditions are met.

By using the brake actuator 20 or the dual diaphragm/lock type actuator 210 in combination with isolating the pneumatic circuit from failure and requiring certain vehicle conditions to be met, an unwanted parking application can be prevented thus minimizing the potential for the parking brake to impact the dynamic stability of the vehicle. The system also eliminates the potential of the parking brake application on the vehicle axle unless all vehicle conditions are met.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A brake system for a vehicle comprising:
   at least one source of pressurized air for pressurizing the vehicle brake system;
   a brake actuator configured to receive air from the source of pressurized air;
   a control operatively associated with the source of pressurized air for selective application of the brake actuator; and
   a supplemental parking brake control system in communication with the control and the brake actuator, the control system:
   including a plurality of inputs, individual inputs indicative of a predetermined vehicle condition, the vehicle conditions including (i) a parking condition of the vehicle, (ii) a gradient of a road on which the vehicle is to be held stationary, (iii) a speed of the vehicle and (iv) a state of a vehicle ignition;
   responsive to data indicative of gradient and speed vehicle conditions;
   configured to send a signal to the brake actuator to allow gradient and speed dependent supplemental parking; and
   configured to prevent application of the brake actuator.

2. The brake system of claim 1, wherein the plurality of inputs includes a parking indicator switch in communication with the control and responsive to data indicative of the control being actuated for a vehicle park condition.

3. The brake system of claim 2, wherein the parking indicator switch is selectively actuated when a pressure of the brake system is reduced to a predetermined trip brake system pressure.

4. The brake system of claim 1, wherein the plurality of inputs includes an incline indicator switch responsive to data indicative of gradient, the incline indicator switch being selectively actuated on gradients greater than about 20%.

5. The brake system of claim 4, wherein the plurality of inputs includes an override switch configured to override the incline indicator switch for verification of brake actuator operation.

6. The brake system of claim 1, wherein the plurality of inputs includes a speed enable switch responsive to data indicative of vehicle speed, the speed enable switch selectively actuated at vehicle speeds less than about 3 mph.

7. The brake system of claim 1, wherein the plurality of inputs includes a vehicle ignition switch responsive to data indicative of a state of the vehicle ignition, the vehicle ignition switch being actuated when the vehicle ignition is on.

8. The brake system of claim 1, further including a solenoid valve operatively associated with the control system, the solenoid valve being responsive to the signal from the control system to prevent actuation of the brake actuator by the control if all vehicle conditions are not met.

9. The brake system of claim 1, wherein the brake actuator is one of a spring brake actuator and a dual diaphragm lock actuator.

10. The brake system of claim 9, further including at least one inversion valve for monitoring brake system pressure and delivering a pneumatic brake signal to the dual diaphragm lock actuator.

11. A supplemental brake system for a front pneumatic brake circuit of a vehicle, the front pneumatic brake circuit including a source of pressurized air for pressurizing the brake circuit, a front pneumatic brake actuator configured to receive air from the source of pressurized air, and a control in communication with the source of pressurized air and configured to send a pneumatic signal to the front pneumatic brake actuator to exhaust pressurized air to atmosphere to actuate the front pneumatic brake actuator, the brake control system comprising:

a valve in communication with the control and the front pneumatic brake actuator, the valve having a normally open state for preventing actuation of the front pneumatic brake actuator and a closed state to actuate the front pneumatic brake actuator; and a plurality of switches in communication with the control and the valve, individual switches responsive to data indicative of a vehicle condition, wherein the vehicle conditions include (i) a parking condition of the vehicle, (ii) a gradient of a road on which the vehicle is to be held stationary, (iii) a speed of the vehicle and (iv) a state of a vehicle ignitions each switch being actuated once its respective vehicle condition is met, wherein the valve is in the open state and the front pneumatic brake actuator remains released when all switches are not actuated and all vehicle conditions are not met, wherein actuation of each switch sends a signal to the valve to move to the closed state and actuate the front pneumatic brake actuator.

12. The brake system of claim 11, wherein the plurality of switches includes: a parking indicator switch selectively actuated by a vehicle park condition; an incline indicator switch selectively actuated on gradients greater than a threshold gradient; a speed enable switch selectively actuated at vehicle speeds less than threshold vehicle speed; and a vehicle ignition switch selectively actuated by a state of the vehicle ignition.

13. The brake system of claim 12, wherein the threshold gradient is greater than about 20% and the threshold vehicle speed is less than about 3 mph.

14. The brake system of claim 12, wherein the plurality of switches further includes a momentary override switch configured to override the incline indicator switch for verification of front pneumatic brake actuator operation.

15. A method of providing supplemental front parking for a vehicle, the method comprising the steps of: providing air pressure to a front parking brake actuator; activating the front parking brake actuator as a function of vehicle gradient and vehicle speed conditions; and activating the front parking brake actuator if the gradient is greater than about 20% and the vehicle speed is less than about 3 mph.

16. The method of claim 15, further comprising activating the front parking brake actuator if the vehicle ignition is on and a vehicle park condition is met.

17. The method of claim 16, further comprising providing a valve in communication with the front parking brake actuator, and selectively actuating the valve to activate the front parking brake actuator if all vehicle conditions are met.

* * * * *